United States Patent [19]
Sambhu

[11] 3,754,186
[45] Aug. 21, 1973

[54] POWER FACTOR MEASURING CELL ARRANGEMENT

[75] Inventor: Mahesh K. Sambhu, Wayne, N.J.

[73] Assignee: Beckman Instruments, Inc., Fullerton, Calif.

[22] Filed: May 8, 1972

[21] Appl. No.: 251,429

[52] U.S. Cl.......... 324/65 R, 324/30 R, 324/DIG. 1
[51] Int. Cl............................................. G01r 27/02
[58] Field of Search............... 324/65 R, 65 P, 30 R, 324/30 B, DIG. 1

[56] References Cited
UNITED STATES PATENTS

| | | | |
|---|---|---|---|
| 2,682,168 | 6/1954 | McDonald | 324/65 R X |
| 3,060,721 | 10/1962 | Marsh et al. | 324/65 R X |
| 3,267,418 | 8/1966 | Wolfe | 324/65 R X |

*Primary Examiner*—Stanley T. Krawczewicz
*Attorney*—James M. Thompson and Robert J. Steinmeyer

[57] ABSTRACT

A cell for measuring the power factor of oil including a guard electrode, a center electrode and an outer electrode, all of which are adapted to be immersed in a test sample of the oil. The center electrode and the outer electrode of the cell are adapted to be selectively connected in parallel with a variable impedance arm of a bridge that is energized by a suitable a.c. source. The output of the bridge is taken on two conductors which are connected to the dual inputs of a differential amplifier that is used to drive an output meter. The bridge is initially balanced with the cell disconnected. When the cell and sample are connected to the bridge the meter reading reflects the total current $I = I_C + I_X$ flowing between the cell electrodes. The bridge is then readjusted so that a null indication is provided at the meter. The ratio of the meter reading with the meter nulled to the reading I above is proportional to the power factor of the cell oil. In one embodiment the guard electrode of the cell is grounded, and in an alternative embodiment the guard electrode is driven at the same potential as the center electrode by an operational amplifier arranged in a voltage follower configuration. The connections between the cell and the bridge can be made by a triaxial cable so that power factor readings on samples can be made in a remote chamber at other than ambient temperature.

5 Claims, 2 Drawing Figures 3,754,186

POWER FACTOR MEASURING CELL ARRANGEMENT

BACKGROUND OF THE INVENTION

The present invention relates to a cell and an associated bridge circuit for measuring oil power factor. More particularly the invention concerns a cell adapted for providing direct readings of the power factor of oil samples, with the effects of line voltage surges and noise being substantially eliminated from the meter readings.

Various arrangements have been utilized in the prior art to measure the power factor of oil, such as the insulating oil used in transformers and various electrical equipment.

As used hereinafter oil power factor represents the ratio of the watts dissipated in the cell and oil to the total voltamperes drawn by the cell and oil. This is represented by the following equation:

$$P_f = W/EI \qquad (1)$$

Since $$W = E^2/R_x = EI_x ; \qquad (2)$$

then $$P_f = I_x/I , \qquad (3)$$

where $R_x$ represents the resistive losses of the cell and oil, and $I_x$ represents the loss current flow through the cell and oil.

Prior art instruments are subject to certain disadvantages in that they are not portable. Also they can produce readings that are inaccurate due to line voltage surges and noise occurring in the cell circuits, for example from the voltage source used to energize the cell electrodes. Other interference can occur in the cells due to noise and interfering voltages that occur in the instruments containing the oil samples. Therefore a need exists for an improved cell and measuring instrument combination that is portable and is shielded to prevent interference from extraneous sources.

OBJECTS OF THE INVENTION

Accordingly it is an object of the invention to provide an improved cell with associated bridge circuitry for measuring power factor of oil samples, which overcomes the disadvantages of power factor measuring instruments mentioned hereinbefore.

It is another object of the invention to provide a measuring cell which includes a differential amplifier connected in the output of the measuring circuit associated therewith to help cancel line voltage surges and noise from the output of the instrument.

It is a further object of the invention to provide such a cell which is light and portable, and which can be selectively connected to a remote measuring circuit by a flexible triaxial cable.

It is yet a further object of the invention to provide a cell with an associated measuring circuit having an output meter calibrated for direct reading of power factor.

These and other objects and advantages of the invention are attained in a cell including a center electrode, a guard electrode and an outer electrode that are adapted to be immersed in a sample of the oil to be tested. The center electrode and the outer electrode are selectively connected in parallel with a variable impedance arm of a measuring bridge. The bridge is energized from a suitable a.c. source and the output of the bridge is taken from two opposite corners via two conductors which are connected to the dual inputs of a differential amplifier. The output of the differential amplifier is used to drive a meter which is calibrated for direct reading of oil power factor. In one embodiment the guard electrode is connected to ground and in another embodiment, utilizing a triaxial cable, the guard electrode is maintained at the same potential as the center electrode by an operational amplifier connected in a voltage follower configuration between the center electrode and the guard electrode.

BRIEF DESCRIPTION OF THE DRAWINGS

The foregoing and other objects and features of the invention will become apparent from the following detailed description taken in conjunction with the accompanying drawings wherein.

DETAILED DESCRIPTION OF THE INVENTION

Figure 1:
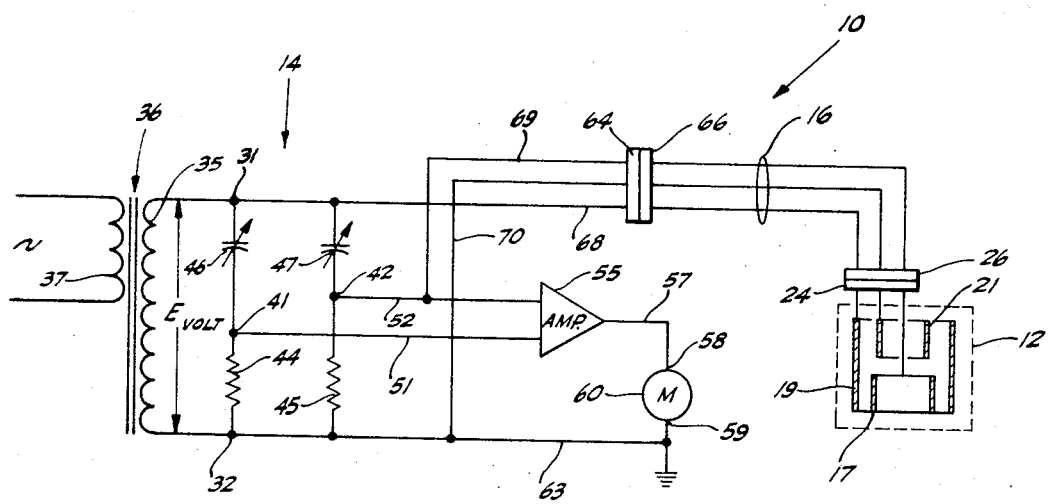
FIG. 1 is a schematic diagram of a first preferred embodiment of the invention.

Referring now to the drawings and particularly to FIG. 1 one embodiment of the invention is illustrated comprising a power factor measuring oil cell arrangement generally indicated at 10, including a cell 12 and a bridge 14. The cell and bridge are selectively connected together by conductors generally indicated at 16.

The cell is schematically indicated in FIG. 1 as including a center electrode 17, and an outer electrode 19, with a guard electrode 21 arranged therebetween. As shown, each of the electrodes is connected by a suitable conductor with a terminal block 24 arranged outside the cell and adapted to receive a corresponding plug 26 of the conductors. The cell electrodes are mounted within a suitable cover, not illustrated, and are adapted to be immersed in a test sample of oil.

Bridge 14 includes input terminals 31, 32 which are connected, respectively, to the end terminals of the secondary winding 35 of a transformer 36. The transformer primary winding 37 is adapted to be connected to a suitable a.c. source, not illustrated, that is used to energize the oil cell during the power factor measurement. Bridge 14 also includes output terminals 41, 42. The bridge is comprised of fixed impedance arms such as resistances 44, 45 connected between input terminal 32 and output terminals 41, 42 respectively, and variable impedance arms, such as variable capacitors 46, 47 connected between input terminal 31 and output terminals 41, 42, respectively. Conductors 51, 52 are connected, respectively, between terminals 41, 42 and dual input terminals of a differential amplifier 55. The output of the differential amplifier is connected via a conductor 57 to one terminal 58 of a meter 60 having its other terminal 59 connected to ground. Terminal 32 is also connected to ground via a conductor 63.

The bridge is electrically associated with a terminal 64 adapted to be connected to a corresponding plug 66. More particularly, terminal 31 is connected via a conductor 68 to one contact of connector 64, terminal 42 is connected by a conductor 69 to a second contact of connector 64 and terminal 32 is connected via a conductor 70 to yet a third contact of connector 64.

As shown, each of the electrodes of cell 12 is selectively connected with a corresponding contact of connector 64. In the embodiment illustrated the center electrode 17 of the cell is connected to output terminal 42 of the bridge, and outer electrode 19 of the cell is connected to input terminal 31 of the bridge whereby the electrodes are placed in electrical parallel with variable impedance arm 47 of the bridge. In addition, guard electrode 21 is electrically connected to input terminal 32 of the bridge, which is grounded.

In the operation of the cell and bridge arrangement, the cell electrodes are immersed in the test sample of oil with the conductors disconnected from connector 24. The bridge is then energized from the alternating current source and the variable impedance arms, i.e. variable capacitors 46, 47 are balanced so that the meter is nulled. By this it is meant that capacitor 47 is set for almost maximum capacitance and capacitor 46 is then adjusted to achieve balance so that a minimum meter indication is produced. Capacitor 46 is left at that setting. The cell is then electrically associated with the bridge whereby the cell electrodes are energized. A meter reading is then taken from meter 60 which is indicative of the current I flowing through the oil between the center and outer electrodes of the cell. Finally, variable capacitor 47 is readjusted to again give a null indication of the meter, which produces a reading $I_x$. The ratio of $I_x$ to I is proportional to the power factor of the oil sample. Thus, by calibrating the meter scale in percent power factor units proportional to deflection, and setting the current deflection I at a fixed point on the scale, the meter can be read directly in power factor units.

Figure 2:
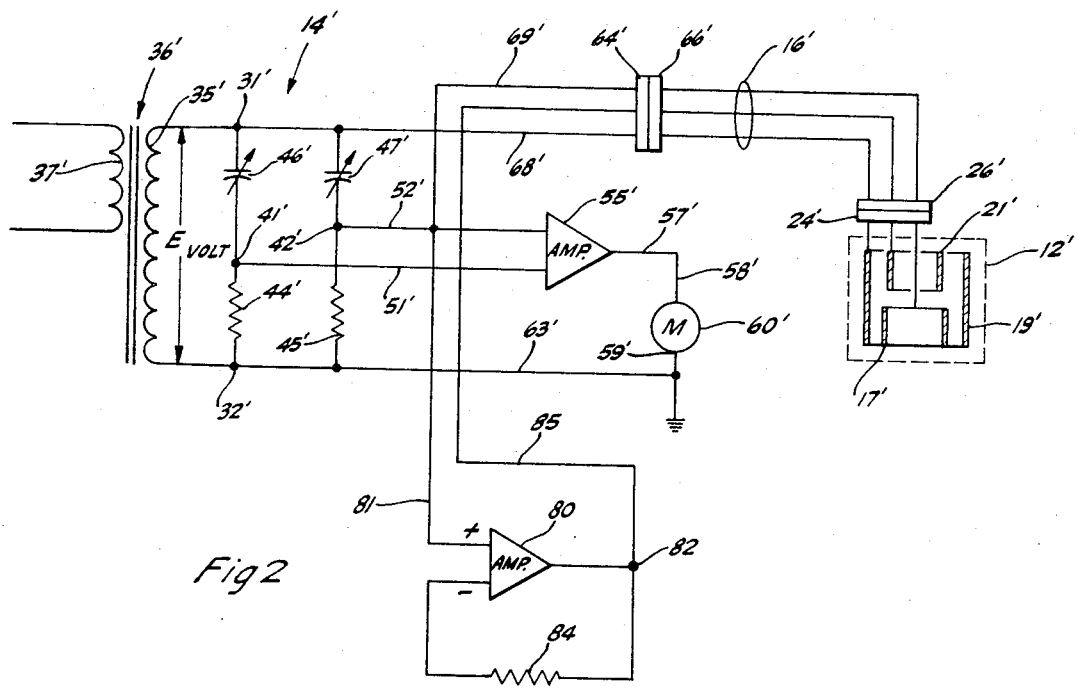
FIG. 2 is a schematic diagram of an alternative preferred embodiment of the invention.

Referring now to FIG. 2 an alternative preferred embodiment of the invention is illustrated wherein like elements of the circuit are designated by like primed numerals. The embodiment of FIG. 2 differs from that of FIG. 1 in that it utilizes a triaxial cable 16' between the cell and the bridge and the guard electrode is maintained at the same potential as is the center electrode. This is accomplished by use of an operational amplifier 80 having a positive input terminal connected via a conductor 81 to output terminal 42' of the bridge. The output terminal 82 of amplifier 80 is connected via a feedback resistor 84 to the negative input terminal of the amplifier. Output terminal 82 is also connected, via a conductor 85 and the inner shield of the triaxial cable, to the guard electrode of the cell. In the configuration shown operational amplifier 80 functions as a voltage follower amplifier so that the potential of the center electrode is supplied to the input of amplifier 80. The output of the amplifier follows this input voltage, thereby maintaining the guard electrode at the same potential as the center electrode. This has the effect of reducing to a very low value the effective capacity between the center conductor and the inner shield of the triaxial cable. Since the effective capacity between the center electrode and the inner shield appears in parallel with resistor 45' of the bridge, this arrangement minimizes errors in the measurement due to such capacity.

It should be apparent that the foregoing embodiments result in a highly advantageous oil power factor measuring cell and configuration that is portable and provides direct readings of power factor of the test samples of the oil. In addition, the use of a differential amplifier in the output of the bridge circuit results in cancellation of voltage surges occurring from the cell energizing source, as well as cancellation of noise in the meter output. The use of the voltage follower in conjunction with the triaxial cable is also advantageous in that it reduces the capacity between the respective electrodes and improves the accuracy of the instrument for the reasons mentioned hereinbefore.

What is claimed is:

1. An arrangement for measuring power factor of an oil sample comprising
    a cell having a center electrode, a guard electrode and an outer electrode, said electrodes adapted to be immersed in the oil sample;
    a measuring circuit associated with the cell including a bridge having a pair of input terminals, adapted to be energized by an a.c. source, and a pair of output terminals electrically interconnected to the input terminals by a pair of variable impedance arms and a pair of fixed impedance arms, a dual input differential amplifier, the input of said amplifier electrically connected to the output terminals of said bridge, and a meter connected to the output terminal of said differential amplifier; and
    circuit means for selectively connecting the center electrode of the cell and the outer electrode in electrical parallel with one of the variable impedance arms of the bridge.

2. The arrangement of claim 1 wherein said circuit means comprises a triaxial cable.

3. The arrangement of claim 2 wherein the guard electrode is connected to ground.

4. The arrangement of claim 1 further including a dual input operational amplifier, a feedback resistor connected between the operational amplifier output and one input thereof, means connecting the other input of the operational amplifier to the center electrode of the cell and means connecting the output of the operational amplifier to the guard electrode of the cell.

5. The arrangement of claim 2 wherein the meter is directly calibrated in power factor units.

* * * * *